United States Patent
Murray

(10) Patent No.: US 10,484,173 B2
(45) Date of Patent: Nov. 19, 2019

(54) X-ONLY GENERIC MAPPING FUNCTION FOR PACE PROTOCOL

(71) Applicant: NXP B.V., Eindhoven (NL)

(72) Inventor: Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 353 days.

(21) Appl. No.: 15/397,462

(22) Filed: Jan. 3, 2017

(65) Prior Publication Data

US 2018/0191498 A1  Jul. 5, 2018

(51) Int. Cl.
| | |
|---|---|
| H04L 29/06 | (2006.01) |
| H04L 9/30 | (2006.01) |
| G06F 7/72 | (2006.01) |
| H04L 9/08 | (2006.01) |
| H04L 9/14 | (2006.01) |

(52) U.S. Cl.
CPC ............ *H04L 9/3013* (2013.01); *G06F 7/725* (2013.01); *H04L 9/0841* (2013.01); *H04L 9/0844* (2013.01); *H04L 9/14* (2013.01); *H04L 9/3066* (2013.01)

(58) Field of Classification Search
CPC ... H04L 9/3013; H04L 9/0841; H04L 9/0844; H04L 9/14; H04L 9/3066; G06F 7/725
See application file for complete search history.

(56) References Cited

U.S. PATENT DOCUMENTS

| | | | | | |
|---|---|---|---|---|---|
| 5,581,616 | A | * | 12/1996 | Crandall | .................. G06F 7/725 380/28 |
| 6,141,420 | A | * | 10/2000 | Vanstone | ................ G06F 7/725 380/28 |
| 6,307,935 | B1 | * | 10/2001 | Crandall | .................. G06F 7/725 380/28 |

(Continued)

OTHER PUBLICATIONS

Anonymous, "Rabin olyptosystem," Wikipedia, Dec. 8, 2016, Retrieved from Internet Feb. 9, 2018: https://en.wikipedia.org/wiki/Rabin_cryptosystem.

(Continued)

*Primary Examiner* — John B King

(57) ABSTRACT

A method of calculating the x-coordinate($x_M$) of a point mapping in an elliptic curve Diffie-Hellman key exchange protocol (EC-DHKF), wherein the point mapping is defined as sG+H, where sG is a point ($x_S, y_S$) on an elliptic curve and H is a point ($x_H, y_H$) on the elliptic curve, including: computing $V = y_S^2$ based upon the elliptic curve and $x_S$; computing $W = y_H^2$ based upon the elliptic curve and $x_H$; computing $U = \text{sqrt}(W \cdot V) \bmod p$, where p is a large prime number; choosing $U' = U$ or $U' = p - U$ such that $U'$ based upon a characteristic agreed upon by the parties to the EC-DHKF; computing $x_M$ based upon V, W, U', $x_S$, $x_H$, and p.

24 Claims, 1 Drawing Sheet

(56) References Cited

U.S. PATENT DOCUMENTS

| | | | |
|---|---|---|---|
| 6,782,100 | B1 | 8/2004 | Vanstone et al. |
| 7,103,769 | B1* | 9/2006 | Fleming .................. G06F 21/85 713/150 |
| 7,240,084 | B2* | 7/2007 | Gura ........................ G06F 7/724 708/492 |
| 8,666,066 | B2 | 3/2014 | Icart |
| 9,106,635 | B2* | 8/2015 | Campagna .............. H04L 63/08 |
| 9,450,755 | B2* | 9/2016 | Murray .................. H04L 9/3066 |
| 2010/0172493 | A1* | 7/2010 | Georgiades ........... H04L 9/3066 380/28 |
| 2010/0199095 | A1* | 8/2010 | Ho ........................ H04L 9/0844 713/171 |
| 2012/0288086 | A1* | 11/2012 | Schaffer .................. G06F 7/724 380/28 |
| 2012/0288093 | A1* | 11/2012 | Murray .................. H04L 9/3066 380/255 |
| 2015/0333906 | A1* | 11/2015 | Rahman .................... G06F 7/58 380/44 |
| 2018/0115419 | A1* | 4/2018 | Bos ......................... G06F 7/582 |

OTHER PUBLICATIONS

Goldwasser, Shafi et al., "Lecture Notes on Cryptography," Jul. 2008, pp. 1-289, retrieved from Internet Feb. 12, 2018: https://cseweb.ucsd.edu/~mihir/papers/gb.pdf; Cryptography Course Taught at MIT, Cambridge, Massachusetts, USA.

McGrew, David et al., "RFC 6090—Fundamental Elliptic Curve Cryptography Algorithms," Feb. 2011, pp. 1-35. Retrieved from tire Internet Feb. 9, 2018: https ://tools.ietf.org/html/.

Montgomery, Peter L., "Speeding the Pollard and Elliptic Curve Methods of Factorization," Mathematics of Computation, Jan. 1987, pp. 243-264, vol. 48, No. 177, American Mathematical Society, US.

Elligator : Elliptic-curve points indistinguishable from uniform random strings Bernstein, Hamburg, Krasnova, Lange CCS '13 Nov. 4-8, 2013 Berlin, Germany.

https://eprint.iacr.org/2009/226 "How to hash into elliptic curves", Thomas Icart.

* cited by examiner

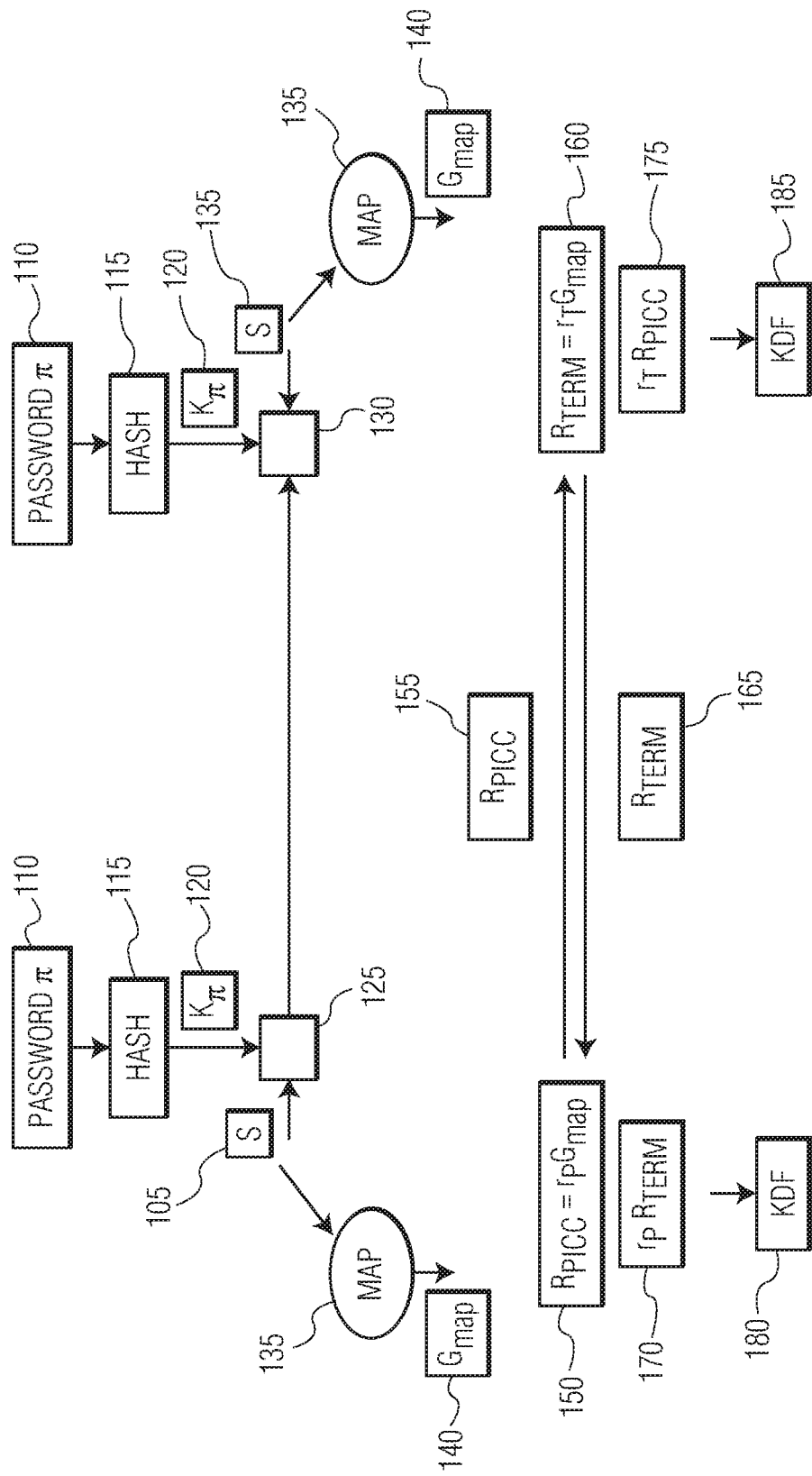

X-ONLY GENERIC MAPPING FUNCTION FOR PACE PROTOCOL

TECHNICAL FIELD

Various exemplary embodiments disclosed herein relate generally to an elliptic curve key exchange protocol (e.g., Password Authenticated Connection Establishment (PACE) protocol) X-only mapping function.

BACKGROUND

The PACE protocol was developed by the German Bundesamt für Sicherheit in Informationstechnik (BSI), originally for application within electronic passports. The PACE protocol will be used as an example of an elliptic curve key exchange protocol in the embodiments described below. The PACE protocol establishes a high entropy shared key between participants by first encrypting a random nonce under a password-derived key and then performing a mapping from this nonce to a random basepoint for a Diffie-Hellman key exchange (DHKF). Because this mapped basepoint is not known to the attacker, the protocol is secure against active man-in-the-middle adversaries and no distinguisher of a correct password guess is presented to an attacker, providing resistance against dictionary attacks on the password space.

FIG. 1 illustrates the PACE protocol in its most general form using elliptic curve cryptography (ECC). The nonce s 105 is randomly selected. A shared password 110 may then be hashed using a hash function 115 to generate a key K 120. The nonce s 105 may be encrypted 125 using the key K 120. The encrypted nonce s is then decrypted 130 using the same key K 120 derived from the shared password 110 resulting in the nonce s in the clear. The nonce s 105 is mapped 135 to a point $G_{map}$ 140 on an agreed upon elliptic curve. As a result $G_{map}$, should be unknowable to an attacker. $G_{map}$ may then be used as a basepoint for an elliptic curve Diffie-Hellman key exchange (EC-DHKF).

The EC-DHKF is also shown. A first party selects a random value $r_P$ which is multiplied 150 with the base point $G_{map}$ using an elliptic curve point multiplication to produce $R_{PICC}$ 155. The value $R_{PICC}$ 155 is then shared with a second party. The second party selects a random value $r_T$ which is multiplied 160 with the base point $G_{map}$ using an elliptic curve point multiplication to produce $R_{TERM}$ 165. The value $R_{TERM}$ 165 is then shared with the first party. The first party then multiplies 170 $R_{TERM}$ 165 by $r_P$ using an elliptic curve point multiplication to obtain a value that is input to a key definition function (KDF) 180 to produce a shared encryption key. The second party then multiplies 175 $R_{PICC}$ 155 by $r_T$ using an elliptic curve point multiplication to obtain a value that is input to a key definition function KDF 185 to produce a shared encryption key which is the same as the key produced by the first party using KDF 180.

This EC-DHKF is secure against man-in-the-middle attacks while the protocol is executing because it is conducted with an unknown basepoint, and nothing is revealed which gives the attacker a better-than-guessing advantage in learning the password.

Various mapping functions may be used to create $G_{map}$. The mapping function seeks to produce a random generator in the elliptic curve group, either by directly hashing onto the curve (integrated mapping) or, as in the case of the so-called generic mapping, using an initial Diffie-Hellman exchange and then computing sG+H, where H is the point created by the initial EC-DHKF.

The generic mapping can also be augmented by a so-called "CAM mapping". This is not really a different mapping function but rather an extra protocol step in which a device performs a verifiable private key operation with a single modular multiplication (using the inverse of the device private key) re-using a random point from the generic mapping exchange; this CAM mapping process is not described herein, but it can be applied.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of calculating the x-coordinate($x_M$) of a point mapping in an elliptic curve Diffie-Hellman key exchange protocol (EC-DHKF), wherein the point mapping is defined as sG+H, where sG is a point ($x_S, y_S$) on an elliptic curve and H is a point ($x_H, y_H$) on the elliptic curve, including: computing $V = y_S^2$ based upon the elliptic curve and $x_S$; computing $W = y_H^2$ based upon the elliptic curve and $x_H$; computing $U = \text{sqrt}(W \cdot V) \mod p$, where p is a large prime number; choosing $U' = U$ or $U' = p - U$ such that $U'$ based upon a characteristic agreed upon by the parties to the EC-DHKF; computing $x_M$ based upon V, W, U', $x_S$, $x_H$, and p.

Further various exemplary embodiments relate to a non-transitory machine-readable storage medium encoded with instructions for calculating the x-coordinate($x_M$) of a point mapping in an elliptic curve Diffie-Hellman key exchange protocol (EC-DHKF), wherein the point mapping is defined as sG+H, where sG is a point ($x_S, y_S$) on an elliptic curve and H is a point ($x_H, y_H$) on the elliptic curve, including: instructions for computing $V = y_S^2$ based upon the elliptic curve and $x_S$; instructions for computing $W = y_H^2$ based upon the elliptic curve and $x_H$; instructions for computing $U = \text{sqrt}(W \cdot V) \mod p$, where p is a large prime number; instructions for choosing $U' = U$ or $U' = p - U$ such that $U'$ based upon a characteristic agreed upon by the parties to the EC-DHKF; instructions for computing $x_M$ based upon V, W, U', $x_S$, $x_H$, and p.

Various embodiments are described wherein the elliptic curve is a Montgomery curve of the form $y^2 = x^3 + Ax^2 + x \mod p$.

Various embodiments are described wherein $V = x_S^3 + A \cdot x_S^2 + x_S \mod p$.

Various embodiments are described wherein $W = x_H^3 + A \cdot x_H^2 + x_H \mod p$.

Various embodiments are described wherein $x_M = ((V + W - 2U')/(x_S - x_H)^2) - A - x_S - x_H \mod p$.

Various embodiments are described wherein the elliptic curve is a Weierstraß curve of the form $y^2 = x^3 + Ax + B \mod p$.

Various embodiments are described wherein $V = x_S^3 + A \cdot x_S + B \mod p$.

Various embodiments are described wherein $W = x_H^3 + A \cdot x_H + B \mod p$.

Various embodiments are described wherein $x_M = ((V + W - 2U')/(x_S - x_H)^2) - x_S - x_H \mod p$.

Various embodiments are described wherein the elliptic curve is an Edwards curve of the form $y^2 + x^2 = c^2(1 + dx^2 y^2)$ where c and d are scalars.

Various embodiments are described wherein the elliptic curve is a twisted Edwards curve of the form $ax^2+y^2=1+dx^2y^2$ where a and d are scalars.

Various embodiments are described wherein the characteristic agreed upon by the parties includes one of: whether the least significant bit of U or p−U is zero; whether the least significant bit of U or p−U is one; which of U or p−U when written as a positive integer is closer to zero; which of U or p−U when written as a positive integer is further from zero; and which of U or p−U is a quadratic residue.

BRIEF DESCRIPTION OF THE DRAWINGS

In order to better understand various exemplary embodiments, reference is made to the accompanying drawings, wherein:

FIG. 1 illustrates the PACE protocol using elliptic curve cryptography (ECC).

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments are described below that include a mapping function that may be used with the PACE that performs only the x-coordinate computations for the Diffie-Hellmann operations in the ECC-based implementation of the PACE protocol. Although embodiments described herein use a Montgomery curve, the embodiments may be applied to other implementations of the PACE protocol using other curves. Also, the embodiments described herein may be used for x-coordinate only computations for other types of elliptic curve based exchange protocols.

Because the core of the generic mapping is the calculation of $G_{map}=sG+H$, a point addition operation is required that would normally require knowledge of the y-coordinates of the points being added. However, many systems are designed/specified to perform EC-DHKF using x-coordinates only, and frequently exploit various implementation optimizations in doing so. These optimizations reduce the computational requirements to perform the EC-DHKF. This raises the question of whether a generic mapping may be implemented efficiently when using such systems.

Embodiments are disclosed below that show how to create an agreed x-coordinate out of a mapping function that may be used as the basis of the second EC-DHKF using Gmap as the basepoint, and which is computed on x-only inputs from the scalar multiplication sG and the x-coordinate agreement scheme resulting in point H.

Accordingly, H is the point $(x_H, y_H)$, and $S=sG$ is the point $(x_S, y_S)$. It is important to note that $y_H$ and $y_S$ are not unambiguously known, and only $x_H$ and $x_S$ are supplied as inputs to the map function, the desired output being an agreed value for $x_{MAP}$.

Knowing H and S only up to the uncertainty results in two possible x-coordinates that may be produced for a sum point. As a result, an unambiguous choice may be made by an agreed-upon convention.

With the x-coordinates of S and H, the two possible results for the x-coordinates of a sum point are the values for the x-coordinate of S+H, S+(−H), (−S)+H, or (−S)+(−H). These correspond to the x-coordinates corresponding to ±(S+H) and ±(S−H).

Because either of these results could have validly arisen from a "full" generic mapping function, from a security point of view it does not matter whether the x-coordinate of S+H or S−H is used as the basepoint-x for the second EC-DHKF, but it is important that there is a convention which both sides agree on when the protocol executes.

Accordingly, a generic map-to-x-coordinate function may be defined using Montgomery curve $y^2=x^3+Ax^2+x$ mod p as follows. If $(x_S, y_S)$ and $(x_H, y_H)$ are coordinates of S and H respectively, then the x-coordinates of the possible map points are given by the equation:

$$x=((y_S-y_H)^2/(x_S-x_H)^2)-A-x_S-x_H \bmod p, \quad (1)$$

where A is from the curve equation $y^2=x^3+Ax^2+x$ (e.g., on Dan Bernstein's Curve-25519, A=486662).

Because the purpose of this mapping function is to accommodate the situation where $y_S$ and $y_H$ are not known unambiguously and because they may have been computed using an optimized x-only Diffie-Hellmann function, the ambiguity that may arise in the selection of either the x-coordinate of S+H or S−H needs to be resolved.

In order to resolve which x-coordinate to choose, expand $(y_S-y_H)^2=y_S^2-2 y_S*y_H+y_H^2$ and substitute for $y_S^2$ and $y_H^2$ using the curve equation, leaving only the term $-2 y_S*y_H$ to deal with; a value for this term may be derived with a single square root operation in the field because, $$y_S*y_H=\text{sqrt}(y_S^2*y_H^2)=\text{sqrt}((x_S^3+A*x_S^2+x_S)*(x_H^3+A*x_H^2+x_H))$$

where the computation of a square root depends on the exact congruence of the prime p defining the underlying field. The simplest cases for such a computation are:

when p=3 mod 4, sqrt(z) mod p is computable as $z^{(p+1)/4}$ mod p since, if z is a quadratic residue mod p, then $z^{(p-1)/2}=1$ mod p, and $z^{(p+1)/2}=z$ mod p and since p+1 is divisible by 4 it follows that $z^{(p+1)/4}$ mod p=sqrt(z); and when p=1 mod 4 and p=5 mod 8, sqrt(z) is computable using Atkin's square root algorithm, which is a constant-time computation using with one exponentiation and four modular multiplications; this case covers the commonly used Curve22519 specified by Dan Bernstein.

Other cases require a troublesome probabilistic algorithms for finding square roots in Galois field, and these approaches are troublesome because they have the potential to leak timing information about the value of the calculated square root (e.g., recall that confidentiality of the ephemeral basepoint used in the second exchange phase is a key security objective of the PACE protocol).

Having computed one square root $$\text{sqrt}((x_S^3+A*x_S^2+x_S)*(x_H^3+A*x_H^2+x_H)) \bmod p$$

then the other is trivially known to be $$p-\text{sqrt}((x_S^3+A*x_S^2+x_S)*(x_H^3+A*x_H^2+x_H)) \bmod p$$

and it should be clear that, because p is odd, these two roots have differing values for their least significant bit when reduced mod p.

Now a convention may be defined as to which square root to use. It might be that someone really computed y-coordinates $y_S$ and $y_H$ instead deriving the product $y_S*y_H$, in which case they need to be told to compute equation (1) with a given convention for the product $y_S*y_H$ e.g. choose $y_S*y_H$ or $(p-y_S*y_H)$, for example, such that the least significant bit of the result mod p is zero.

The effect of such a sign change in equation (1) would be to change $(y_S-y_H)^2$ into $(y_S+y_H)^2$, which is how two x-coordinates can arise from the original equation defining the sum of points as a result of changing the sign of either point's y-coordinate.

Accordingly, the steps of the map function computation are as follows:
1. Compute $V=x_S^3+A*x_S^2+x_S \bmod p$ (i.e., calculating $y_S^2$);
2. Compute $W=x_H^3+A*x_H^2+x_H \bmod p$ (i.e., calculating $y_H^2$);
3. Compute $U=\text{sqrt}(W*V) \bmod p$ using an algorithm which depends on the values of p mod 4 and p mod 8 (i.e., calculating $y_S*y_H$);
4. Choose $U'=U$ or $p-U$ such that U' has its least significant bit set to zero (i.e., choosing the positive or negative root); and
5. Compute $x_M=((V+W-2U')/(x_S-x_H)^2)-A-x_S-x_H \bmod p$.

The result of this map-to-x function is an agreed x-coordinate $x_M$ of either S+H or S−H, which can then be used as the basis for the second x-only Diffie-Hellmann exchange. Alternatively, in step 4 above, U' may be selected such that its least significant bit is set to one. Other agreed upon characteristics may be used as well to determine whether to choose U' as U or p−U. Such agreed upon characteristics should be agreed upon by the two parties using the PACE protocol. Other conventions may be used as well. For example, the value closes to or furthest from zero when the value is written as a positive integer may be chosen by agreement. Also, the square root that is the quadratic residue may be chosen. This only works when −1 is a quadratic non-residue mod p, i.e., when p=3 mod 4, because p=4k+3=>(p−1)/2=2k+1 so $(-1)^{((p-1)/2)}=-1$ is the Legendre symbol of −1. However, this convention has an implementation advantage when p=3 mod 4, because if $v=w^2 \bmod p$ is computed using sqrt(v) by $v^{((p+1)/4)}$, the root automatically results, which is a quadratic residue.

An example will now be provided using the short Weierstraß curve $y^2=x^3+Ax+B \bmod p$. On the short Weierstraß curve the addition law results in a slightly different equation for the x-coordinate of the sum of two points S and H thus $$x=((y_S-y_H)^2/(x_S-x_H)^2)-x_S-x_H \bmod p. \quad (2)$$

The only difference being the absence of the constant term in (1); otherwise, the mapping function computation can proceed along exactly the same lines as in the Montgomery curve case.

Accordingly, the steps of the map function computation when using a short Weierstraß form curve may be defined as follows:
1. Compute $V=x_S^3+A*x_S+B \bmod p$;
2. Compute $W=x_H^3+A*x_H+B \bmod p$;
3. Compute $U=\text{sqrt}(W*V) \bmod p$ using an algorithm which depends on the values of p mod 4 and p mod 8;
4. Choose $U'=U$ or $p-U$ such that U' has its least significant bit set to zero; and
5. Compute $x_M=((V+W-2U')/(x_S-x_H)^2)-x_S-x_H \bmod p$.

Again, the result of this map-to-x function is an agreed x-coordinate $x_M$ of either S+H or S−H, which can then be used as the basis for the second x-only Diffie-Hellmann exchange. Alternatively, in step 4 above, U' may be selected such that its least significant bit is set to one. Other agreed upon characteristics may be used as well to determine whether to choose U' as U or p−U. Such agreed upon characteristics should be agreed upon by the two parties using the PACE protocol as described above.

A mapping function has been described that allows the PACE protocol with generic/CAM mapping to be used in an "x-only" EC-Diffie-Hellmann context, using either Montgomery curves or short Weierstraß form curves. In both cases the mapping function requires one square root computation, an inversion, and a small number of modular multiplication, addition, and subtraction operations; with a suitable implementation of the inversion, constant-time execution of the mapping function is possible. Such implementation may reduce the computation required for the PACE protocol in an EC-Diffie-Hellmann context.

Other elliptic curves may be used as well. For example, an Edwards curve of the form $y^2+x^2=c^2(1+dx^2 y^2)$ where c and d are scalars may be used. Also, a twisted Edwards curve of the form $ax^2+y^2=1+dx^2 y^2$ where a and d are scalars may be used. These curves may be used in a manner similar to the Montgomery curve and short Weierstraß curves described above using only a single coordinate.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, key delivery systems described herein may include a computer implementing a computer program. Such system, may also include other hardware elements including storage, network interface for transmission of data with external systems as well as among elements of the key delivery systems.

In an embodiment of the invention, the computer program may include computer program code adapted to perform all the steps of a method according to the invention when the computer program is run on a computer. Preferably, the computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of calculating an x-coordinate ($x_M$) of a point mapping in an elliptic curve Diffie-Hellman key exchange protocol (EC-DHKE) between two parties, wherein the point mapping is defined as sG+H, where sG is a point ($x_s$,$y_s$) on an elliptic curve and H is a point ($x_H$,$y_H$) on the elliptic curve, comprising:
   computing $V=y_s^2$ based upon the elliptic curve and $x_s$;
   computing $W=y_H^2$ based upon the elliptic curve and $x_H$;
   computing $U=sqrt(W \cdot V)$ mod p, where p is a large prime number, wherein sqrt stands for square root;
   choosing U'=U or U'=p−U such that U' is based upon a characteristic agreed upon by the parties to the EC-DHKE;
   computing $x_M$ based upon V, W, U', $x_s$, $x_H$, and p, wherein the method allows elliptic curve Diffie-Hellmann key exchange for an x-coordinate only implementation in order to establish a connection between the two parties.

2. The method of claim 1, wherein the elliptic curve is a Montgomery curve of the form $y^2=x^3+Ax^2+x$ mod p.

3. The method of claim 2, wherein $V=x_S^3+A*x_S^2+x_S$ mod p.

4. The method of claim 3, wherein $W=x_H^3+A*x_H^2+x_H$ mod p.

5. The method of claim 1, wherein $x_M=((V+W-2U')/(x_S-x_H)^2)-A-x_S-x_H$ mod p.

6. The method of claim 1, wherein the elliptic curve is a Weierstraß curve of the form $y^2=x^3+Ax+B$ mod p.

7. The method of claim 6, wherein $V=x_S^3+A*x_S+B$ mod p.

8. The method of claim 7, wherein $W=x_H^3+A*x_H+B$ mod p.

9. The method of claim 6, wherein $x_M=((V+W-2U')/(x_S-x_H)^2)-x_S-x_H$ mod p.

10. The method of claim 1, wherein the elliptic curve is an Edwards curve of the form $y^2+x^2=c^2(1+dx^2 y^2)$ where c and d are scalars.

11. The method of claim 1, wherein the elliptic curve is a twisted Edwards curve of the form $ax^2+y^2=1+dx^2 y^2$ where a and d are scalars.

12. The method of claim 1, wherein the characteristic agreed upon by the parties includes one of: whether the least significant bit of U or p−U is zero; whether the least significant bit of U or p−U is one; which of U or p−U when written as a positive integer is closer to zero; which of U or p−U when written as a positive integer is further from zero; and which of U or p−U is a quadratic residue.

13. A non-transitory machine-readable storage medium encoded with instructions for calculating an x-coordinate ($x_M$) of a point mapping in an elliptic curve Diffie-Hellman key exchange protocol (EC-DHKE) between two parties, wherein the point mapping is defined as sG+H, where sG is a point ($x_s$,$y_s$) on an elliptic curve and H is a point ($x_H$,$y_H$) on the elliptic curve, comprising:
   instructions for computing $V=y_s^2$ based upon the elliptic curve and $x_s$;
   instructions for computing $W=y_H^2$ based upon the elliptic curve and $x_H$;
   instructions for computing $U=sqrt(W \cdot V)$ mod p, where p is a large prime number, wherein sqrt stands for square root;
   instructions for choosing U'=U or U'=p−U such that U' is based upon a characteristic agreed upon by the parties to the EC-DHKE;
   instructions for computing $x_M$ based upon V, W, U', $x_s$, $x_H$, and p, wherein executing the instructions allows elliptic curve Diffie-Hellmann key exchange for an x-coordinate only implementation in order to establish a connection between the two parties.

14. The non-transitory machine-readable storage medium of claim 13, wherein the elliptic curve is a Montgomery curve of the form $y^2=x^3+Ax^2+x$ mod p.

15. The non-transitory machine-readable storage medium of claim 14, wherein $V=x_S^3+A*x_S^2+x_S$ mod p.

16. The non-transitory machine-readable storage medium of claim 15, wherein $W=x_H^3+A*x_H^2+x_H$ mod p.

17. The non-transitory machine-readable storage medium of claim 13, wherein $x_M=((V+W-2U')/(x_S-x_H)^2)-A-x_S-x_H$ mod p.

18. The non-transitory machine-readable storage medium of claim 13, wherein the elliptic curve is a Weierstraß curve of the form $y^2=x^3+Ax+B$ mod p.

19. The non-transitory machine-readable storage medium of claim 18, wherein $V=x_S^3+A*x_S+B$ mod p.

20. The non-transitory machine-readable storage medium of claim 19, wherein $W=x_H^3+A*x_H+B$ mod p.

21. The non-transitory machine-readable storage medium of claim 18, wherein $x_M=((V+W-2U')/(x_S-x_H)^2)-x_S-x_H$ mod p.

22. The non-transitory machine-readable storage medium of claim 13, wherein the elliptic curve is an Edwards curve of the form $y^2+x^2=c^2(1+dx^2 y^2)$ where c and d are scalars.

23. The non-transitory machine-readable storage medium of claim 13, wherein the elliptic curve is a twisted Edwards curve of the form $ax^2+y^2=1+dx^2 y^2$ where a and d are scalars.

24. The non-transitory machine-readable storage medium of claim 13, wherein the characteristic agreed upon by the parties includes one of: whether the least significant bit of U or p−U is zero; whether the least significant bit of U or p−U is one; which of U or p−U when written as a positive integer is closer to zero; which of U or p−U when written as a positive integer is further from zero; and which of U or p−U is a quadratic residue.

* * * * *